United States Patent
Mishra et al.

(10) Patent No.: US 7,139,792 B1
(45) Date of Patent: Nov. 21, 2006

(54) MECHANISM FOR LOCKING CLIENT REQUESTS TO A PARTICULAR SERVER

(75) Inventors: Manav Mishra, Hillsboro, OR (US); Satyendra Yadav, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 742 days.

(21) Appl. No.: 09/675,694

(22) Filed: Sep. 29, 2000

(51) Int. Cl.
*G06F 15/16* (2006.01)
*H04L 9/00* (2006.01)

(52) U.S. Cl. .............. 709/203; 709/219; 709/228; 713/153; 726/14

(58) Field of Classification Search .............. 709/225, 709/217, 105, 203, 228; 713/153, 166; 726/14
See application file for complete search history.

(56) References Cited

U.S. PATENT DOCUMENTS

| | | | |
|---|---|---|---|
| 5,717,923 A | 2/1998 | Dedrick | 395/613 |
| 5,774,668 A * | 6/1998 | Choquier et al. | 709/223 |
| 5,875,296 A * | 2/1999 | Shi et al. | 713/202 |
| 6,041,166 A * | 3/2000 | Hart et al. | 709/238 |
| 6,098,093 A * | 8/2000 | Bayeh et al. | 709/203 |
| 6,367,009 B1 * | 4/2002 | Davis et al. | 713/166 |
| 6,374,300 B1 * | 4/2002 | Masters | 709/229 |
| 6,480,894 B1 * | 11/2002 | Courts et al. | 709/227 |
| 6,505,250 B1 * | 1/2003 | Freund et al. | 709/226 |
| 6,598,167 B1 * | 7/2003 | Devine et al. | 713/201 |
| 6,611,873 B1 * | 8/2003 | Kanehara | 709/238 |
| 6,732,269 B1 * | 5/2004 | Baskey et al. | 713/153 |
| 6,772,333 B1 * | 8/2004 | Brendel | 713/153 |
| 2001/0034792 A1 * | 10/2001 | Swildens | 709/238 |

OTHER PUBLICATIONS

U.S. Appl. No. 60/188,142, filed Mar. 2000, Swildens.*
Freier et al. "The SSL Protocol Version 3.0" Internet-Draft from the Transport Layer Security Working Group of IETF.*

* cited by examiner

*Primary Examiner*—Saleh Najjar
*Assistant Examiner*—David Lazaro
(74) *Attorney, Agent, or Firm*—Blakely, Sokoloff, Taylor & Zafman LLP

(57) ABSTRACT

In one aspect of the invention is a method for locking in all client requests having the same session I.D. to the same server to facilitate secure e-commerce transactions. A client's session I.D. is mapped to an SSL context between a dispatcher and a server such that all subsequent client requests having the same session I.D. are forwarded to the same server.

26 Claims, 4 Drawing Sheets

MECHANISM FOR LOCKING CLIENT REQUESTS TO A PARTICULAR SERVER

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention relates to the field of server load balancing, Internet quality of service, and security and more specifically, to a mechanism for locking client requests to a particular server.

BACKGROUND OF THE INVENTION

The demand for e-commerce brings a unique set of challenges to network infrastructures. For example, one server may be inadequate to provide the required capacity and scalability to serve the increasing size of e-commerce transactions. Server load balancing (SLB) was developed to overcome this problem, where a number of servers (server farm) act as a single server and a special device (dispatcher) dispatches requests to servers in a manner that balances the load on all the servers in the server farm. Some SLB schemes may dispatch requests to the server having the least load, and other SLB schemes may dispatch requests to any server such that the network is optimized, for example. For purposes of simplicity, the server selected by any given SLB scheme is referred to herein as the "best server".

In e-commerce transactions hosted on a website, however, SLB introduces a new problem. When a customer sends information to a website that utilizes an SLB scheme, the information is sent to the best server computed by the dispatcher, Server A, and stored locally on that server. For example, a customer of Amazon.com® selects books and places them in the shopping cart, and then decides to visit other areas of the site before purchasing. When the customer returns to the shopping cart, effectively to access state information (the state of previously stored information), the SLB scheme again computes the best server, this time Server B, to direct the customer's request to. Since the distribution of requests amongst the servers in the server farm may have changed since the customer's last request, the best server on the subsequent request is different from the best server on the first request. Consequently, the customer's information does not exist on Server B, and the shopping cart may be empty when the customer returns to it.

One current solution to this problem is to globally maintain state information, such that the state information can be accessed by any server in the server farm. For example, state information can be maintained in a special state server, or even one of the servers in the server farm. One of the disadvantages to this, however, is the latency associated with memory accesses by the servers, as well as dispatcher latency associated with storing state information.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In one aspect of the invention, a method for directing requests from the same client in a single session to the same server in secure e-commerce transactions is described. In one exemplary use for this method, a user submits state information, hereinafter referred to as a client request, over the Internet to an e-commerce website, such as Amazon.com®, and the state information is stored on a system server. The e-commerce website comprises a dispatcher (a system for sending client requests to a server) and server farm (a pool of a plurality of servers for processing client requests). The client request is received by the dispatcher, and a unique session identifier (I.D.) is assigned to the client request. The dispatcher selects a server to send the client request to, and sends the client request to the selected server. The session I.D. is mapped to a server identifier associated with the selected server.

In preferred embodiments, when the client request is received by the dispatcher, the dispatcher establishes a secure connection, preferably SSL (Secure Sockets Layer), with the client. The dispatcher then uses a load balancing algorithm to determine the best server in the server farm to send the client request to. The unique session I.D. is then mapped to an SSL context, which identifies a previously existing SSL tunnel between the dispatcher and the selected server, such that subsequent requests having the same session I.D. can be directed to the same server via the SSL tunnel.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product, which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

Figure 1:
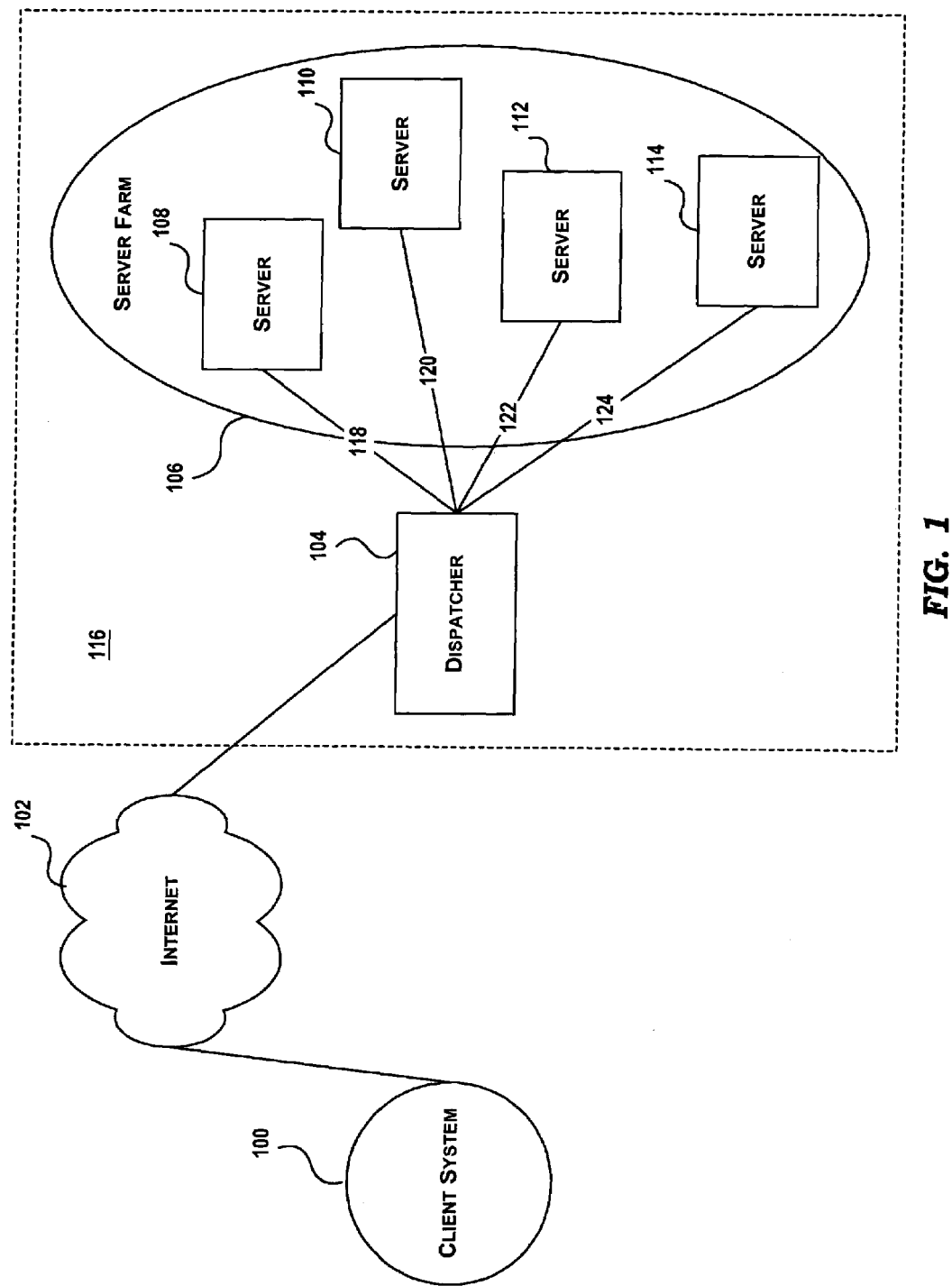
FIG. 1 illustrates an exemplary server load balancing (SLB) environment in which preferred embodiments of the present invention are operable.

FIG. 1 illustrates an exemplary environment in which preferred embodiments of the present invention are operable. A user on a client system 100 logs into a server system 116 to conduct transactions, such as to browse the contents of a website, purchase goods from a website, or request information from a website. The server system 116 comprises a dispatcher 104 and a server farm 106 comprising a plurality of servers 108, 110, 112, 114. The dispatcher receives user requests to process transactions and selects one of the servers 108, 110, 112, 114 to send a given user request to. On a first session of a given user, the dispatcher 104 preferably selects a server 108, 110, 112, 114 from the server farm by using a load balancing algorithm to find the best server. Preferably, the dispatcher selects the same server that was selected for the user's first session on subsequent sessions for the same user if the request comprises secure information.

Figure 3:
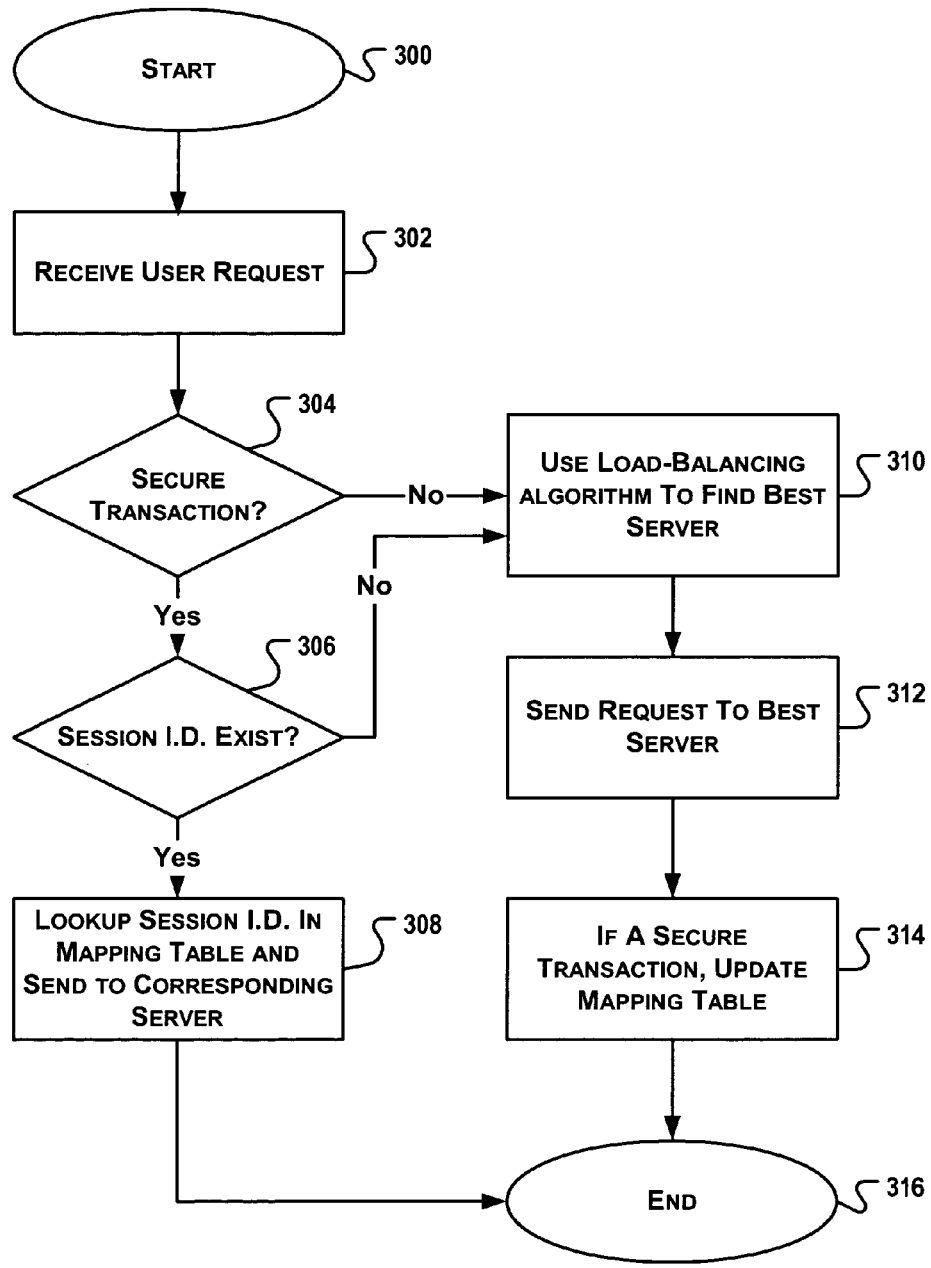
FIG. 3 is a method of preferred embodiments of the invention.

FIG. 3 outlines a method of the present invention starting at block 300. A first user request comprising a session I.D. is received at block 302. At block 304, it is determined if the transaction is a secure transaction. If it is, then at block 306, it is determined if the session I.D. exists in the mapping table. If the session I.D. does not exist in the mapping table, or if the transaction is not secure, then at block 310, a load-balancing algorithm is used to find the best server. Furthermore, the user request is sent to the best server at block 312. If the user request is a secure transaction, then at block 314, the mapping table is updated to include an entry for the session I.D. and the corresponding SSL context for the selected server.

If the transaction is secure and the session I.D. exists, then at block 308, the session I.D. is searched for in the mapping table, and the request is sent to the server corresponding to the session I.D. The method ends at block 316.

Secure Transactions

In preferred embodiments, the dispatcher distinguishes between secure and non-secure transactions. Secure transactions may be determined by the server system. For instance, secure transactions may be determined to comprise credit card transactions, a user's personal information, or user reviews. Non-secure transactions may be determined to comprise a user request for a book rating, for instance. As described herein, secure transactions refer to transactions in which information needs to be saved. Such information, such as personal data, and credit card information, is referred to as state information.

If a user request is determined to be a secure transaction, the dispatcher processes the request differently than if the request were a non-secure transaction. In preferred embodiments, the dispatcher 104 has previously existing SSL (Secure Sockets Layer) tunnels and corresponding SSL contexts 118, 120, 122, 124 with the servers 108, 110, 112, 114 in the server farm 106 to handle secure transactions. An SSL tunnel is a designated channel of communication, and a corresponding SSL context comprises a source IP (Internet protocol) address, a destination IP address, and an encryption algorithm that identifies a corresponding SSL tunnel.

Initial User Session Requests

Figure 2:
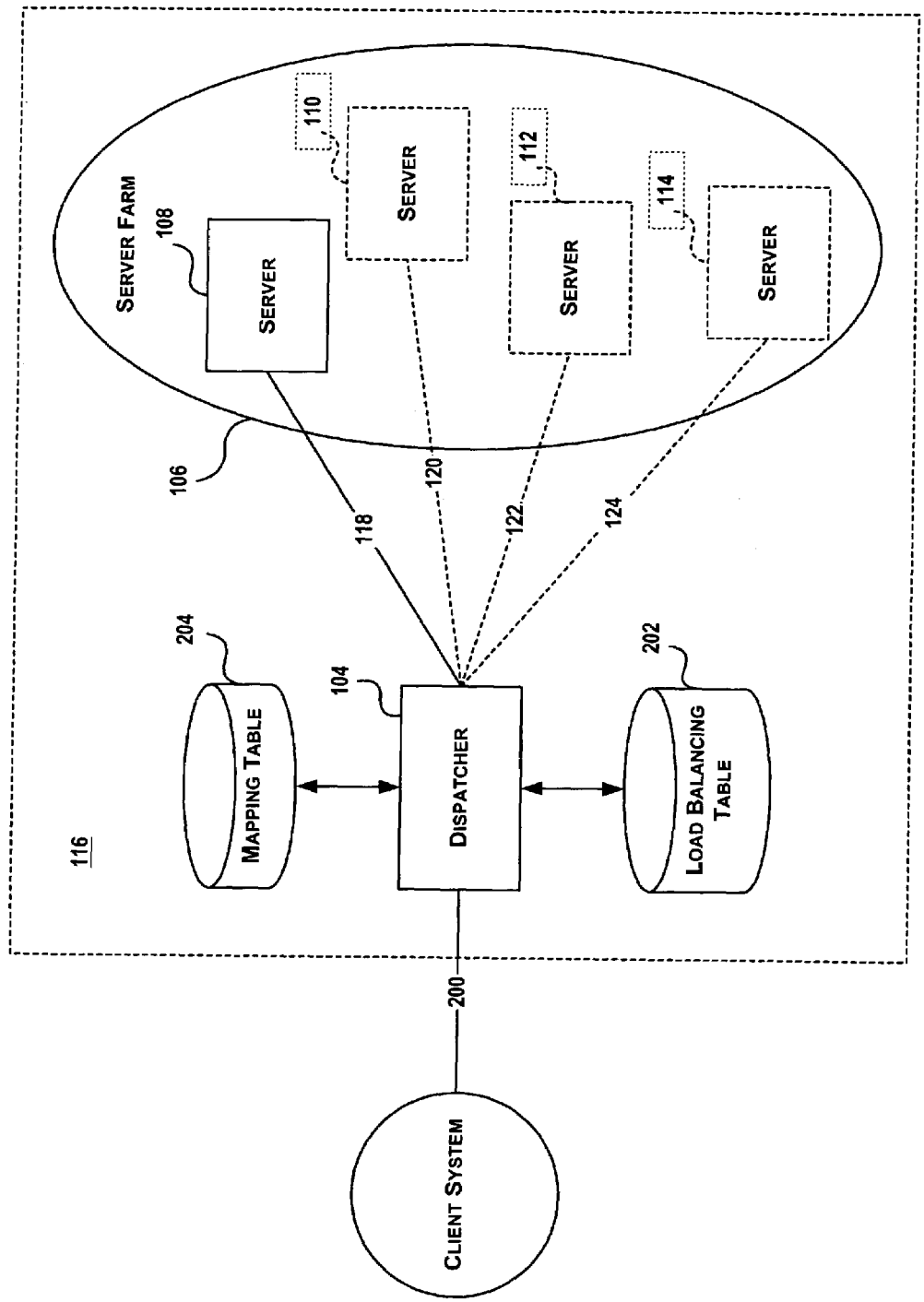
FIG. 2 illustrates elements in an exemplary environment.

When the user logs onto a website associated with a server system 116 to conduct a secure transaction, as shown in FIG. 2, the dispatcher 104 looks in a mapping table 204 to determine if the session I.D. has already been mapped to a specific server. If not, an SSL tunnel and corresponding SSL context 200 between the dispatcher 104 and the client 100 is created. The SSL context between the client 100 and the dispatcher 104 additionally comprises a session I.D. to uniquely identify the user's current login session. For example, a user logs onto Amazon.com®, places items in the shopping cart, submits the items for payment, and then decides to continue browsing the site.

The dispatcher 104 uses a load-balancing algorithm (by employing a load balancer, for instance), to find which one of the servers 108, 110, 112, 114 in the server farm 106 can best handle the current user request. As discussed, supra, the best server can be the server currently having the least load, or the server which can best alleviate network traffic, for instance. A load-balancing table 202 is updated accordingly.

Once a best server is determined, the user request is sent to the selected server 108. The dispatcher then maps the current session I.D. to the SSL context between the dispatcher 104 and the selected server 108 by adding an entry to a mapping table 204 for the session I.D. and the SSL context. The selected server receives the user's request, and stores corresponding information in its local memory for subsequent access.

Subsequent User Session Requests

When the user makes another request, (for example, the user has finished browsing the site and wishes to return to the shopping cart previously submitted), the dispatcher receives the subsequent request. Using the session I.D. from the user request, the dispatcher 104 determines if the session I.D. exists in the mapping table 204. If the session I.D. exists in the mapping table 204, then the dispatcher sends the user's subsequent request to the server corresponding to the session I.D. as indicated by the mapping table 204. Since the previously submitted information is stored on this server, the user's information is quickly accessed on the server, and available to the user.

If the session I.D. does not exist in the mapping table 204, then processing proceeds as described for an initial user session request, supra.

Quality of Service

Where multiple requests are received on the same SSL tunnel between the dispatcher and a given server, a QoS (Quality of Service) Manager uses predetermined algorithms to aggregate multiple streams into a single stream. In reference to FIG. 4, when multiple clients, such as Client 1 404, and Client 2 402, are directed to the same server via an SSL tunnel, as determined by the load balancer 204, a QoS Manager 400 decides which client gets priority of the SSL tunnel. An exemplary algorithm used by the QoS Manager can be found in pending United States patent application entitled "Secure Communications Over Unsecure Links" by Manav Mishra, Raj Yavatkar, and Prakash Iyer, filed on Sep. 5, 2000, Ser. No. 09/654,891.

Figure 4:
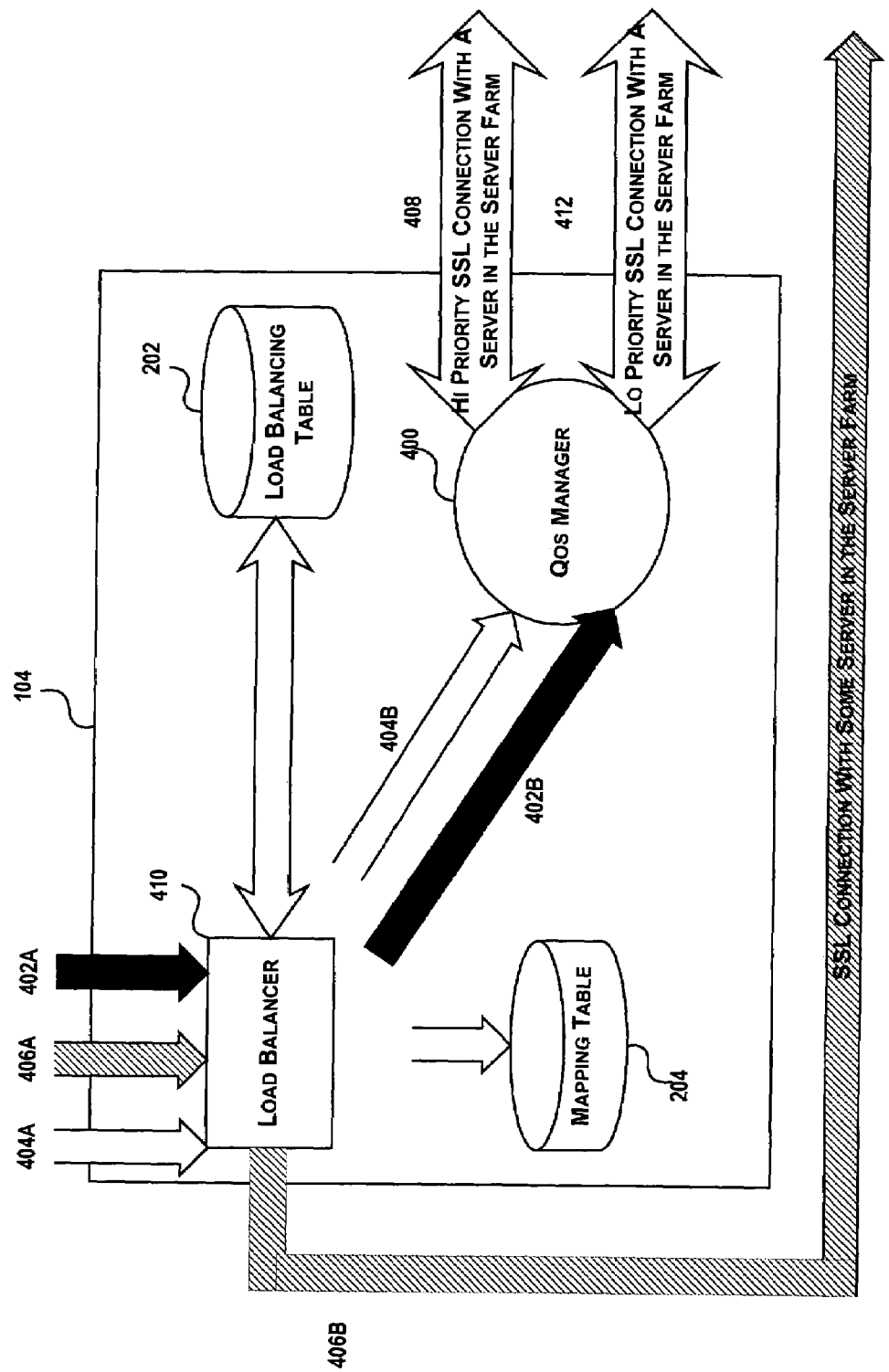
FIG. 4 illustrates how quality of service can be applied in embodiments of the present invention.

FIG. 4 further illustrates that when Client 1 404A, 406A submits a request to the dispatcher 104, Client 1 may submit a secure transaction 404B or a non-secure transaction 406B. If Client 1 submits a non-secure transaction, then a load balancer 204 determines which server in the server farm the client request is to be sent to via the current SSL connection 406B. If Client 1 submits a secure transaction, then a mapping table 204 is searched to determine if a session I.D. associated with Client 1 exists in the table. If it does, then the client request is sent to the server corresponding to the session I.D. in the mapping table 204. If the session I.D. does not exist, then a load balancer 410 uses a load balancing table 202 to determine which server in the server farm to direct the client request to. Client 1 request is then sent to the selected server 408.

Where a second client, Client 2 402A, makes a client request and the load balancer 410 directs Client 2 request to the same server as Client 1, both requests 404B, 402B are sent to a QoS Manager 400 and, the QoS Manager decides which request to handle first. In the example of FIG. 4, Client 1's secure request 404B is a high-priority SSL request, and Client 2's secure request is a low-priority SSL request. The QoS Manager 400 then processes the requests according to their priorities, such that Client 1 404B receives a high-priority SSL connection with one of the servers in the server farm 408, and Client 2 402B receives a low-priority SSL connection with one of the servers in the server farm 412.

Non-Secure Transactions

In one embodiment, if a user request is determined to be a non-secure transaction, the dispatcher processes all user requests in the same way. In other words, the dispatcher uses a load balancing algorithm to find the best server, and forwards all requests to the best server determined at the time a request is received.

In other embodiments, non-secure (non-SSL) transactions can always be mapped to the same server using the scheme for secure transactions by using a cookie, or a block of data, as the session I.D. (rather than the SSL context in the case of a secure transaction). The cookie would be generated by the best server and returned to the client. When another client request is made from the same client, the cookie comprises information about the server that generated the cookie so that the request can be sent to the original server.

CONCLUSION

As described in embodiments of this invention above, the latency associated with global accesses is alleviated, since information is locally stored at selected servers. Moreover, there is no loss of information since the same server is selected to process user requests.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, while embodiments herein have been described to distinguish between secure and non-secure transactions, the invention can be implemented without making this distinction. In other words, regardless of the type of user request, the dispatcher may forward all user requests in the same session to the server for processing.

What is claimed is:

1. A method comprising:
   receiving a first request from a user corresponding to a first transaction at a dispatcher;
   determining if the first transaction is a secure transaction;
   creating at the dispatcher a secure tunnel context between the dispatcher and the user, if the transaction is a secure transaction, wherein the secure tunnel context comprises a session identifier (ID);
   assigning a server to the first request at the dispatcher by adding an entry to a mapping table maintained by the dispatcher;
   associating the session ID with the assigned server;
   receiving a subsequent request from the user corresponding to a second transaction at the dispatcher, the subsequent request comprising the session ID;
   determining if the session ID exists in the mapping table; and
   sending the subsequent request to the assigned server if the session ID exists in the mapping table.

2. The method of claim 1, further comprising using a load balancing algorithm to assign the server to the first and subsequent requests.

3. The method of claim 1, further comprising mapping the session ID to a separate secure tunnel context between the assigned server and the dispatcher.

4. The method of claim 1, further comprising adding the session ID and the assigned server as an entry to the mapping table if the transaction is a secure transaction and the session ID does not exist in the mapping table.

5. The method of claim 1, wherein assigning a server further comprises selecting from among a plurality of established secure tunnels with a plurality of established servers.

6. The method of claim 5, wherein creating the secure tunnel context further comprises creating a secure sockets layer (SSL) context having a source address, a destination address and an encryption algorithm.

7. The method of claim 1, wherein determining if the first transaction is a secure transaction comprises determining if an SSL packet is associated with the first retest.

8. The method of claim 1, wherein a secure transaction comprises transactions in which information about the user is saved at the assigned server.

9. The method of claim 1, wherein a secure transaction comprises transactions in which personal data and credit card information about the user is saved at the assigned server.

10. The method of claim 1, further comprising:
    applying a quality of service algorithm to prioritize the first request and the subsequent request.

11. An article of manufacture including a machine readable medium having stored thereon data representing sequences of instructions, which, when executed by a machine, cause the machine to perform operations including:
    receiving a first request from a user corresponding to a first transaction at a dispatcher;
    determining if the first transaction is a secure transaction;
    creating at the dispatcher a secure tunnel context between the dispatcher and the user, if the transaction is a secure transaction, wherein the secure tunnel context comprises a session identifier (ID);
    assigning a server to the first request at the dispatcher by adding an entry to a mapping table maintained by the dispatcher;
    associating the session ID with the assigned server;
    receiving a subsequent request from the user corresponding to a second transaction at the dispatcher, the subsequent request comprising the session ID;
    determining if the session ID exists in the mapping table; and
    sending the subsequent request to the assigned server if the session ID exists in the mapping table.

12. The article of claim 11, wherein the operations further include mapping the session ID to a separate secure tunnel context between the assigned server and the dispatcher.

13. The article of claim 11, wherein creating the secure tunnel context further comprises creating a secure sockets layer (SSL) context having a source address, a destination address and an encryption algorithm.

14. The article of claim 11, wherein the operations further include using a load balancing algorithm to assign the server to the first request if the first transaction is a secure transaction and the session ID does not exist in the mapping table.

15. The article of claim 11, wherein creating a secure tunnel context further comprises selecting from among a plurality of established secure tunnels with a plurality of servers, assigning a secure tunnel to the assigned server, and adding an entry to the mapping table if the first transaction is a secure transaction and the session ID does not exist in the mapping table.

16. The article of claim 11, wherein the operations further include:
applying a quality of service algorithm to prioritize the first request and the subsequent request.

17. A system comprising:
a mapping table at dispatcher, maintained by the dispatcher and containing session identifiers (IDs) linked to server and secure tunnel context assignments; and
the dispatcher to receive a first request from a user corresponding to a first transaction to determine if the first transaction is a secure transaction, to create a secure tunnel context between the dispatcher and the user if the transaction is a secure transaction, wherein the secure tunnel context comprises a session identifier (ID), to assign a server to the first request by adding an entry to the mapping table, to associate the session ID with the assigned server, to receive a subsequent request from the user corresponding to a second transaction, the subsequent request comprising the session ID, to determine if the session ID exists in the mapping table, and send the subsequent request to the assigned server if the session ID exists in the mapping table.

18. The system of claim 17, further comprising a load balancing table and wherein the dispatcher assigns the server to the first request using the load balancing table if the first transaction is a secure transaction and the session ID does not exist in the mapping table.

19. The system of claim 18, wherein the dispatcher determines if the first and subsequent transactions are secure transactions by determining if a secure sockets layer (SSL) packet is associated with the first and subsequent requests.

20. The system of claim 19, wherein a secure transaction comprises transactions in which information about the user is saved at the assigned server.

21. The system of claim 18, further comprising a quality of service (QoS) manager in communication with the dispatcher to decide which one of multiple user requests is processed if multiple user requests are sent to the same server.

22. The system of claim 17, wherein the dispatcher further maps the session ID to a separate secure tunnel context between the assigned server and the dispatcher.

23. A system comprising:
a load balancing table at a dispatcher and maintained by the dispatcher;
a mapping table at the dispatcher and maintained by the dispatcher, the mapping table containing session identifiers (IDs) linked to server and secure tunnel context assignments; and
the dispatcher to receive a first request from a user corresponding to a first transaction to determine if the first transaction is a secure transaction, to create a secure tunnel context between the dispatcher and the user, if the transaction is a secure transaction, wherein the secure tunnel context comprises a session identifier (ID), to assign a server to the first request by adding an entry to the mapping table, to associate the session ID with the assigned server, to receive a subsequent request from the user corresponding to a second transaction, the subsequent request comprising the session ID, to determine if the session ID exists in the mapping table, and send the subsequent request to the assigned server if the session ID exists in the mapping table.

24. The system of claim 23, wherein the dispatcher further assigns the server to the first request using the load balancing table if the first transaction is not a secure transaction.

25. The system of claim 23, wherein the dispatcher assigns a server by selecting from among a plurality of established secure tunnels with a plurality of established servers, if the first transaction is a secure transaction and the session ID does not exist in the mapping table.

26. The system of claim 23, wherein the dispatcher further adds the session ID and the assigned server as an entry to the mapping table if the first transaction is a secure transaction and the session ID does not exist in the mapping table.

* * * * *